May 16, 1950 R. LISS 2,507,986
SHOAL WATER INDICATOR
Filed June 6, 1946 2 Sheets-Sheet 1
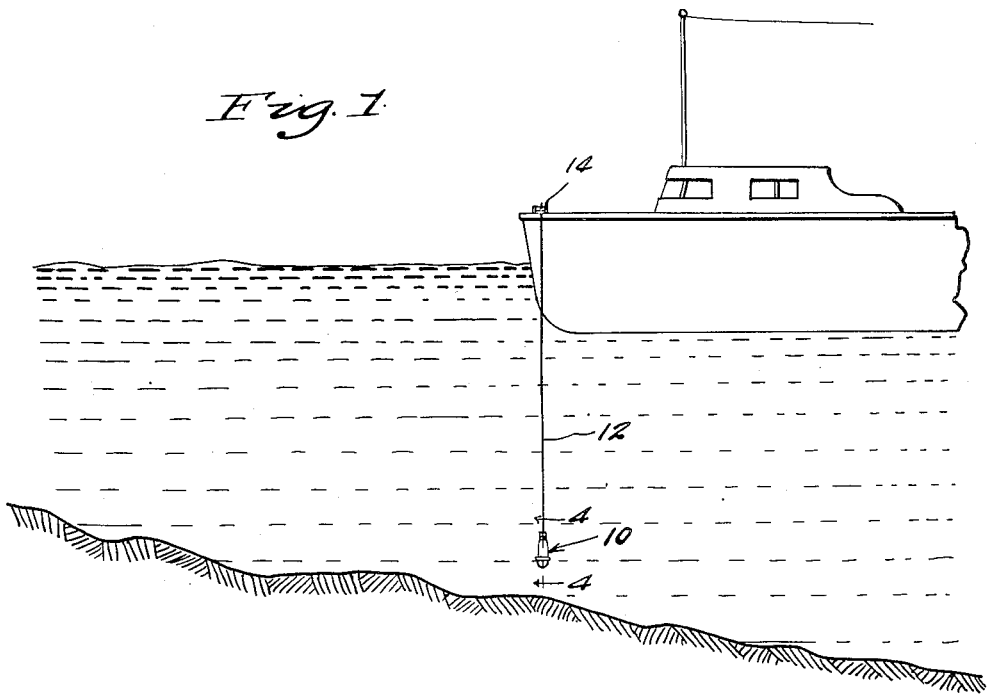
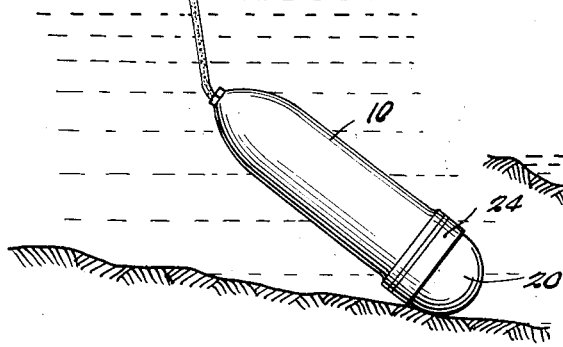
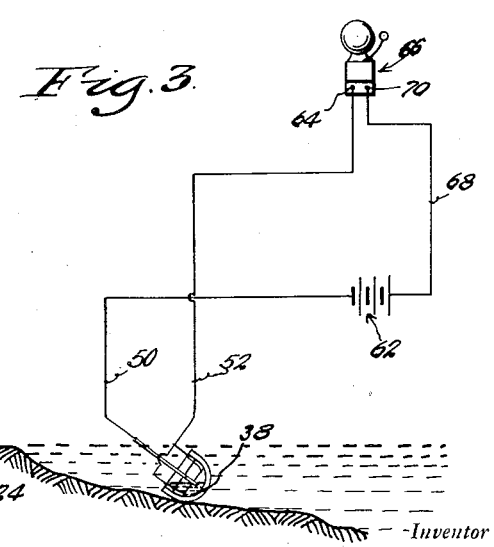
Inventor
RUSSEL LISS
By Clarence A. O'Brien
and Harvey B. Jacobson
Attorneys May 16, 1950 R. LISS 2,507,986
SHOAL WATER INDICATOR
Filed June 6, 1946 2 Sheets-Sheet 2
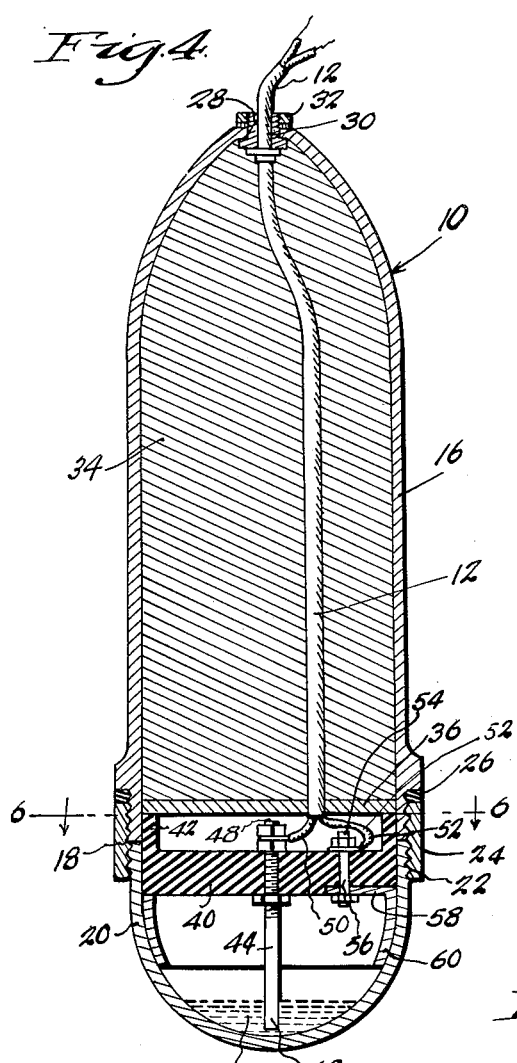
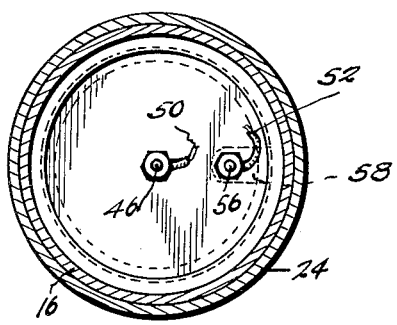
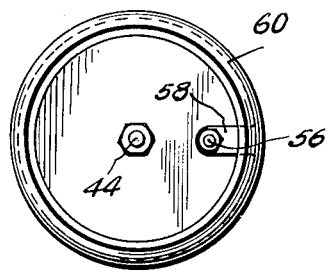
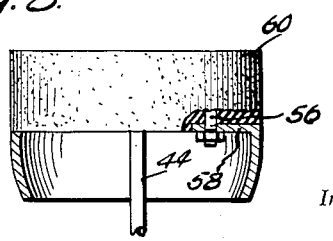
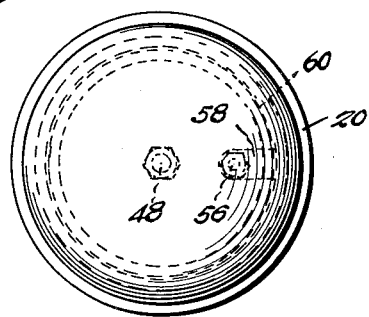
Inventor
Russel Liss
By Clarence A. O'Brien
and Harvey B. Jacobson
Attorneys Patented May 16, 1950

2,507,986

UNITED STATES PATENT OFFICE 2,507,986

SHOAL WATER INDICATOR

Russel Liss, Flushing, N. Y.

Application June 6, 1946, Serial No. 674,703

3 Claims. (Cl. 200—52)

This invention comprises a novel and useful shoal water indicator and more specifically has reference to an indicating device for electrically registering the depths of water and the like.

My primary purpose is to devise a navigating instrument for indicating the depth of water under a vessel.

An important object resides in instantaneously detecting and indicating the presence of obstacles to navigation at a predetermined depth.

Yet another object pertains to an electrical means for instantaneously registering the encountering of an obstruction by the vessel during navigation.

Still another aim of the invention envisions the development of a shoal indicating device which is reliable and durable in operation, easily manipulated, and economical to manufacture.

These, together with diverse other important objects of the invention, are attained by my device, one embodiment of which has been illustrated by way of example only in the accompanying drawings, wherein:

Figure 1 is an elevational view illustrating the device in normal position;

Figure 2 is a detail view in elevation showing the indicator in operative position;

Figure 3 is a diagrammatic sketch of the electrical circuit of the invention;

Figure 4 is a vertical section through the switch member taken substantially on the line 4—4 of Figure 1;

Figure 5 is a bottom plan view of the switch member;

Figure 6 is a horizontal sectional view substantially upon the line 6—6 of Figure 4;

Figure 7 is a bottom plan view of the electrode assembly, and

Figure 8 is a side elevation partly in section of the electrode assembly.

The accompanying drawings illustrate one suitable manner of practicing the principles of this invention, wherein 10 designates the switch and detecting member depending from the line 12 which is adjusted as to length by a reel 14 upon a vessel as shown.

As set forth in Figure 4, the detector 10 composed principally of a suitable dielectric plastic consists of an elongated and round nosed cylinder having an upper casing 16 terminating in a shoulder and reduced lower portion, threaded externally at 18, and a lower casing 20 externally threaded at 22 and abutting the reduced end of member 16. A bushing 24 is internally threaded to engage threads 18 and 22 for uniting these parts in water-tight relation, a gasket 26 being interposed between sleeve 24 and the shoulder or casing 16. It will readily be understood that various equivalent sealing means and attaching means may be utilized for uniting the casings 16 and 20.

The upper end of the casing 16 is axially apertured at 28 and receives a gland or bushing 30 therein, being retained by the nut 32. The casing 16 is filled with a weighting material 34 such as lead or the like to adjacent the lower end of the casing and is retained or enclosed therein by the insulating disk or partition 36. The line 12 constitutes a supporting cable for the member 10 and also a waterproof sheathing for a pair of electrical conductors 38 and extends through the bushing 30, and partition 36, being imbedded and sealed in the weighting material 34.

The lower casing, which may conveniently be hemispherical in shape, has a quantity of mercury indicated at 38 and is closed at its top by the insulating block 40 having an upstanding peripheral rim 42 which abuts the lower surface of partition 36 and underlies the adjoining edges of the casings 16 and 20, to form an intermediate chamber therebetween.

An axial conductor 44 penetrates the partition 40 and has its lower end 46 terminating adjacent the bottom of the casing 20 to be always immersed in the mercury 38, while its upper extremity 48 is positioned in the intermediate chamber and is connected to a conductor 50 emerging from the sheath 12. The other conductor 52 is connected in the intermediate chamber to a binding post 54 upon the upper end of terminal 56 which secures to the lower surface of the block 40 the horizontal arm 58 of an annular metallic sleeve 60, constituting an electrode and adapted to snugly seat upon the inner surface of the lower chamber, with its bottom edge spaced in predetermined relation above the surface of the mercury 38 when the device is in its normal, inoperative, vertical position.

Attention is now directed to Figure 3 for a clearer understanding of the electrical circuit. The lines 50 and 52 are connected respectively with the ground side of a battery 62 and one contact 64 of electrical signaling device 66 such as a bell, light, or the like. The positive side of the battery is connected by a lead 68 to the other connection 70 of the indicator 66. The battery and bell are suitably positioned in the boat, preferably adjacent the helmsman's position.

From the preceding exposition, the operation of the apparatus will be apparent. When the device 10 is hanging in its vertical position, as in Figure 1, there is no electric connection between electrodes 44 and 60 and hence the circuit is de-energized. However, when the device 10 is tilted in any inclination, and it has a high center of gravity due to the weight 34, the mercury 38 runs to the upper surface of the casing 20, thereby closing the contact between the electrodes 44 and 60 and actuating the signaling device.

The device may be employed in several ways to indicate the depth of water below the boat. Thus, the line 12 may be paid out to a predetermined extent and the boat navigated in the customary manner. When the detector 10 strikes a shoal or other outcropping upon the bottom, the high center of gravity and rounded base cause the member to tip or incline, as in Figures 2 and 3, whereupon the mercury switch activates the indicator. Therefore, as soon as the vessel is in shoal waters of a predetermined depth, the alarm is signaled.

Alternatively, the line 12 may at any time be lowered until the switch strikes the bottom, whereupon the resulting inclination will sound the alarm.

Although I have illustrated but one form of my invention, it is obvious that the principles thereof may be practiced by various modified arrangements. Accordingly, I do not limit myself to the exact construction disclosed but may avail myself of all modifications falling within the scope of the appended claims.

I claim as my invention:

1. An electric switch for use in a shoal water alarm, comprising a casing having an upper body, a hollow lower body partitioned from said upper body to form a switch chamber, means for detachably uniting said upper and lower bodies, a central terminal and a circumferential terminal in said chamber, a liquid conductor in said casing in which the lower end of said central terminal is immersed for electrically connecting said terminals when said casing is tilted from a vertical position, said lower casing having a dielectric partition separating the switch chamber from the upper portion of the lower body, said partition supporting both of said terminals.

2. The combination of claim 1 wherein said circumferential terminal is an annular band conforming to and resting against the inner wall of said switch chamber.

3. An electric switch for use in a shoal water alarm comprising a casing having a weighted upper body, a hollow lower body, means detachably uniting said upper and lower bodies, a dielectric cap shaped partition in said lower body dividing the same into an upper chamber and a lower switch chamber, a central terminal and a circumferential terminal in said switch chamber, a liquid conductor in said switch chamber in which the lower end of said central terminal is immersed for electrically connecting said terminals when said casing is tilted from a vertical position, electric conductors connected to said terminals and extending through said partition and means in said upper chamber for connecting an electric circuit to said conductors, said terminals being mounted upon, depending from and supported solely by said partition.

RUSSEL LISS.

REFERENCES CITED

The following references are of record in the file of this patent:

UNITED STATES PATENTS

| Number | Name | Date |
|---|---|---|
| 1,055,153 | Ferguson | Mar. 4, 1913 |
| 2,124,497 | Slauson | July 19, 1938 |

FOREIGN PATENTS

| Number | Country | Date |
|---|---|---|
| 16,245 | Great Britain | 1898 |
| 43,965 | Austria | Sept. 10, 1910 |